(12) United States Patent
Hess

(10) Patent No.: US 9,922,277 B1
(45) Date of Patent: Mar. 20, 2018

(54) BARRIER FOR CONCEALING TEXT OF A TRANSACTIONAL CARD

(71) Applicant: Jesse James Hess, St. Petersburg, FL (US)

(72) Inventor: Jesse James Hess, St. Petersburg, FL (US)

(*) Notice: Subject to any disclaimer, the term of this patent is extended or adjusted under 35 U.S.C. 154(b) by 0 days.

(21) Appl. No.: 15/435,129

(22) Filed: Feb. 16, 2017

(51) Int. Cl.
  *G06K 19/00* (2006.01)
  *G06K 19/04* (2006.01)

(52) U.S. Cl.
  CPC .................. *G06K 19/042* (2013.01)

(58) Field of Classification Search
  USPC ......................... 235/487, 489, 492
  See application file for complete search history.

(56) References Cited

U.S. PATENT DOCUMENTS

| | | | | |
|---|---|---|---|---|
| 2009/0039154 A1* | 2/2009 | Williams | ............... | G06K 19/04 235/380 |
| 2013/0037615 A1* | 2/2013 | Powell | ............. | G06K 19/07327 235/492 |
| 2014/0262852 A1* | 9/2014 | Gourdine | .............. | B32B 37/185 206/39 |
| 2014/0263655 A1* | 9/2014 | Forster | ................. | H01Q 1/2225 235/488 |

* cited by examiner

Primary Examiner — Matthew Mikels
(74) Attorney, Agent, or Firm — Tiffany C. Miller; Inventions International Inc.

(57) ABSTRACT

A barrier for concealing text of a transactional card has a layer of adhesive and a layer of foam. The barrier has a primary side connected to a secondary side at a hinge point. The hinge point has a plurality of perforations. The primary side of the barrier is configured to overlay at least a portion of text on the front face of a transactional card. The secondary side of the barrier is configured to overlay at least a portion of text located on the rear of a transactional card. The barrier has a tab protruding from an outer perimeter edge of the barrier and at least one recess configured to be oriented to overlay the embossed text of a transactional card. The barrier can have an opening configured to make at least a portion of the text of a transactional card visible through the opening to a user.

10 Claims, 9 Drawing Sheets

BARRIER FOR CONCEALING TEXT OF A TRANSACTIONAL CARD

BACKGROUND OF THE INVENTION

1. Field of the Invention

This invention relates, generally, to a barrier for concealing text of a transactional card. More particularly, it relates to a length of material corresponding to the length of a transactional card, the length of material is positioned over a portion of the text of a transactional card.

2. Background Art

Currently, a transactional card including, but not limited to, a credit card, a debit card, or a gift card has identifying text. This identifying text is the number that is embossed and/or encoded on a plastic card that identifies the issuer and the associated cardholder account. This text includes, but is not limited to, a major industry identifier, a bank identification number, an issuer identification number, an account identification number, or a check digit. A protective security sleeve in today's market is configured to retain a transactional card and to cover the identifying text of a transactional card when the transactional card is stored away when no in use. However, this identifying text of a transactional card is visually exposed during use.

For example, this text is exposed during payment transactions when the transactional card is removed from the protective security sleeve when a customer gives their credit card to a merchant for payment processing. An unauthorized user is any individual capable of visually identifying the credit card numbers and text on the card face that is not an authorized signatory of the transactional card. An unauthorized user has the ability to copy, imprint, or scan the credit card numbers. Thus, there is a need for a barrier that can cover at least a portion of the identifying text of a transactional card during a card transaction. As a result, the text on a transactional card will not be visible to any unauthorized user during the processing of the transactional card and the risk of an unauthorized user copying the text of the transactional card for criminal use is greatly reduced. For example, when a customer is processing a card payment at a register at a store, the customer using a protective security sleeve must remove their transactional card from the security sleeve before inserting their transactional card into the card reader. When the protective security sleeve is off of the transactional card, an unauthorized user such as a person standing behind the transactional card holder or an employee in violation of company protocol may be able to visually identify the card numbers and write them down for future misuse.

More particularly, there is a need for a barrier covering at least a portion of the text of a transactional card when the transactional card is swiped through a transactional card reader or when the transactional card is inserted into a chip reader. This would eliminate the ability of an unauthorized user obtaining this identifying text and eliminate the unauthorized activity associated with transactional card information.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a barrier for concealing text of a transactional card. The barrier has a layer of adhesive and a layer of material including, but not limited to foam or plastic. It is within the scope of this current invention for the foam to traverse the length of material. In another embodiment, the foam material is connected to at least a portion of the length of material. For example, the hinge point of the length of material does not need to have the foam layer. The barrier has a primary side connected to a secondary side at a hinge point. The hinge point has a plurality of perforations configured to deform when the plurality of perforations have been tampered with. The primary side of the barrier is configured to overlay at least a portion of text on the front face of a transactional card. The secondary side of the barrier is configured to overlay at least a portion of text located on the back face of a transactional card.

The barrier has a tab protruding from an outer perimeter edge of the barrier. The barrier can have at least one recess configured to be oriented to overlay the embossed and/or protruding text of a transactional card. The barrier can have at least one opening configured to make at least a portion of the text visible through the opening to a user which also includes improvements that overcome the limitations of prior art protective security sleeves is now met by a new, useful, and non-obvious invention.

The novel barrier is configured to conceal at least a portion of text of a transactional card. It is within the scope of this invention for a transaction to include, but not be limited to, a refund or a payment. The barrier has a length of material corresponding to the length of a transactional card when installed onto the transactional card. The length of material has an adhesive layer configured to overlay at least a portion of the text of the transactional card. The length of material has at least one primary side and a secondary side. The at least one primary side of the length of material is configured to cover a portion of text of a primary side of the transactional card. The secondary side of the length of material is configured to cover a portion of text of a secondary side of the transactional card. At least one primary side of the length of material is connected to the secondary side of the length of material at a hinge point. The at least one primary side of the length of material and the secondary side of the length of material are hingedly pivotable.

In a preferred embodiment, at least a portion of the length of material has a layer of material including, but not limited to, foam or plastic connected thereto. The layer of material is configured to conform to the embossed and/or protruding text of a transactional card. The length of material can be made of any material including, but not limited to, a semi-rigid plastic.

In a second embodiment, the length of material has a tab configured to be grasped by a user for removal of the barrier. The tab protrudes from an end of the length of material. The tab may contain text including, but not limited to, an advertisement, a warning label, a logo, or instructions.

In another embodiment, the length of material has at least one recess. The at least one recess is located on the adhesive layer side of the length of material. At least one recess is configured to overlay the text of the transactional card when the length of material is connected to or adhered to the transactional card. Some transactional cards have embossed text that protrudes from the surface of the transactional card. The recess provides a compartment for housing the protruding text so that the protruding text does not deform the length of material, which may reveal an outline or imprint of the text. It is within the scope of the current invention for the barrier to have a plurality of recesses. Many transactional cards contain a plurality of groups of text. For example, four groups of numbers can be found embossed on some current major credit cards. The barrier can have four recesses forming four different compartments configured to overlay each group of numbers. The recesses are formed within the foam of the barrier on the adhesive side of the barrier. This orientation allows for the barrier to adhere to the transactional card when the recesses of the barrier are positioned over the text.

In yet another embodiment, the at least one recess of the novel barrier has a central bore. At least a portion of text of the transactional card is visible through the central bore. In many instances, the last four digits of the transactional card may be required for transactions. This opening creates a window for a user to view at least a portion of text including, but not limited to, the last four digits of the transactional card, while the barrier is connected to the transactional card and without deforming or damaging the tamper evident perforations of the barrier.

In another embodiment, the length of material can have a central bore, whereby, at least a portion of text of the transactional card is visible through the central bore.

In another embodiment, the novel barrier has a plurality of slits traversing at least a portion of the length of material. The plurality of slits is configured to reveal tampering of the length of material. The slits can be oriented in any position including, but not limited to, cross-cut or parallel. When the barrier is peeled away from the transactional card, at least one slit becomes deformed and indicates tampering. It is within the scope of this current invention for the barrier to have at least one slit. It is also within the scope of this invention for the barrier to have perforations located thereon to reveal tampering. The perforations are configured to tear when the barrier is pulled away from the transactional card and thus reveal tampering. The slits and/or perforations can be located on any surface of the barrier such as the primary side, the secondary side, or at the hinge point.

In another embodiment, a length of material has at least one hinge point. The at least one hinge point is configured to conform to an outer perimeter edge of a transactional card. The hinge point has at least one perforation. The length of material has a first end located opposite a second end. The first end of the length of material and the second end of the length of material are hingedly pivotable, whereby, the first end of the length of material is configured to connect to a first side of the transactional card and the second end of the length of material is configured to connect to a second side of the transactional card. At least one end of the length of material has a length great enough to cover at least a portion of text of the transactional card. At least a portion of the first end of the length of material and the second end of the length of material have an adhesive layer. The adhesive layer is configured to secure the barrier to the transactional card.

In another embodiment, the barrier is configured to conceal at least a portion of text of a transactional card. The barrier has a length of material configured to have a length great enough to cover at least a portion of text of the transactional card, whereby, the length of material is configured to cover at least a portion of text of the transactional card. In this embodiment, the barrier does not have to have a hinge point because the barrier only covers only one side of a transactional card. In an alternate embodiment, the barrier can have a hinge point adhered to an outer perimeter edge of a transactional card with at least one length of material protruding from the hinge point. The hinge point can have at least one perforation. At least a portion of the length of material has an adhesive layer. The adhesive layer is configured to secure the barrier to the transactional card.

It is therefore an important object of the present invention to provide a novel barrier connected to a transactional card with the adhesive side of the length of material. It is within the scope of this invention for the length of material to include, but not be limited to, tape, or a semi-rigid plastic such as a transparent slide material. It is within the scope for the current invention for the material to be opaque or of a color to not permit visibility of the transactional card text. When an unauthorized user tries to remove the barrier from the transactional card, the perforations become deformed and the deformed perforations become evidence of tampering.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In a general embodiment the novel barrier is a length of material having at least a portion of a layer of adhesive. The length of material can have a layer of foam or any material capable of conforming to the embossed text of a transactional card so that an imprint of the embossed text does not form through the barrier. The length of material can have a recess to house the embossed text of a transactional card so that an imprint of the embossed text does not form through the barrier.

In a preferred embodiment, the barrier has perforations which when torn or deformed, can identify tampering of the barrier by an unauthorized user. The perforations can include, but not be limited to, an opening, a slit, or a combination. For example, barrier 1 can have perforated openings, cross-cut slits located on a surface of barrier 1, or a plurality of adjacent cuts located thereon. When an unauthorized user (not shown) removes the barrier 1 from transactional card 2, perforations, slits, and/or cuts will tear or deform. The damaged perforations, slits, and/or cuts signify that barrier 1 has been tampered with and that text of a transactional card may have been viewed by an unauthorized user.

Construction of the Novel Barrier

Figure 1A:
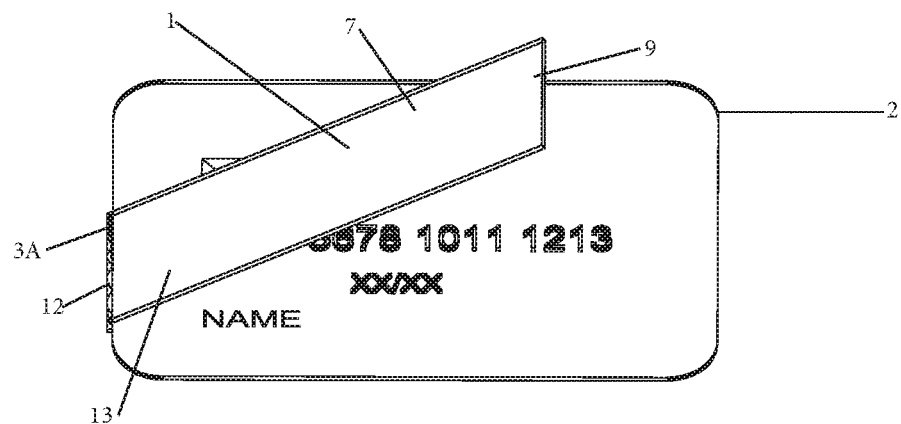
FIG. 1A is a perspective front view of the primary end of the novel barrier positioned over at least a portion of text of a transactional card.
Figure 1B:
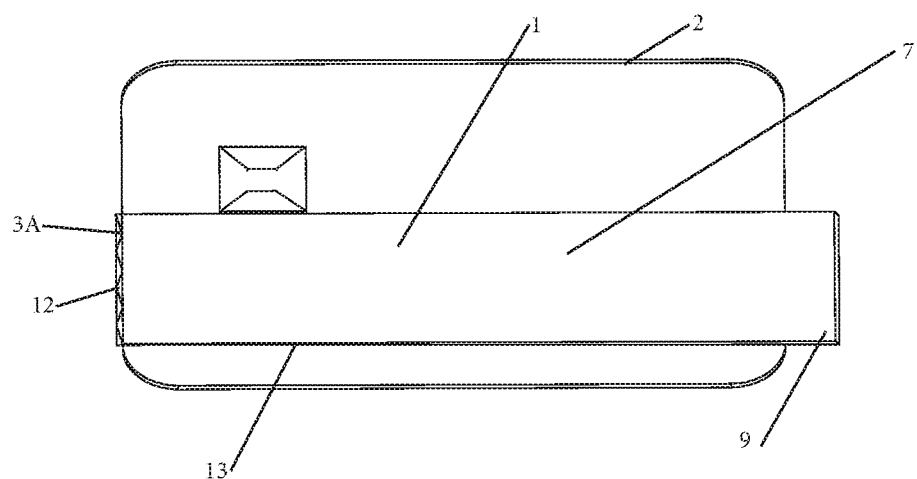
FIG. 1B is a perspective front view of the primary end of the novel barrier covering the text of the front face of a transactional card.
Figure 3:
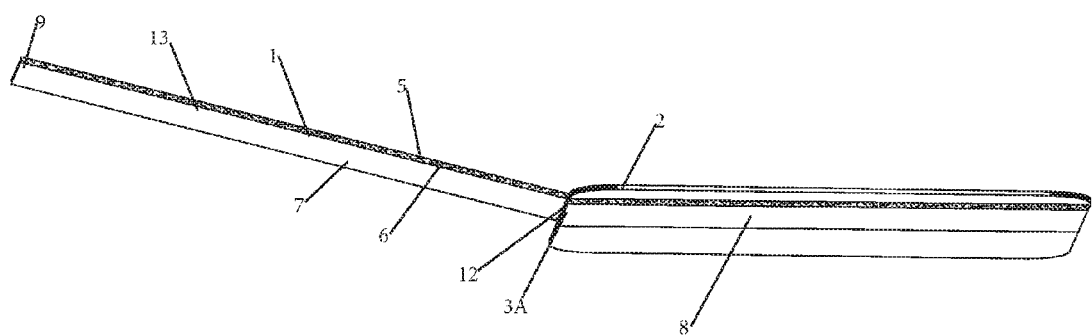
FIG. 3 is a rear perspective view of the secondary side of the novel barrier connected to a transactional card.

It will now be seen, referring to FIGS. 1A, 1B, and 3, the novel barrier 1 includes length of material 13 having a primary side 7 connected to secondary side 8 (FIG. 3) at hinge point 3A. An end of length of material 13 has tab 9 protruding from an end of length of material 13. Barrier 1 is connected to at least one surface of transactional card 2. Perforations 12 are located on a surface of length of material 13. Tab 9 protrudes from an end of transactional card 2.

FIG. 3 shows secondary side 8 of length of material 13 being connected to a rear side of transactional card 2. More particularly, secondary side 8 of length of material 13 is configured to overlay the recesses formed (not shown) from the embossed text of transactional card 2. Length of material 13 has at least a portion of a foam layer 6 connected thereto. The adhesive layer 5 overlays the foam layer.

Figure 2:
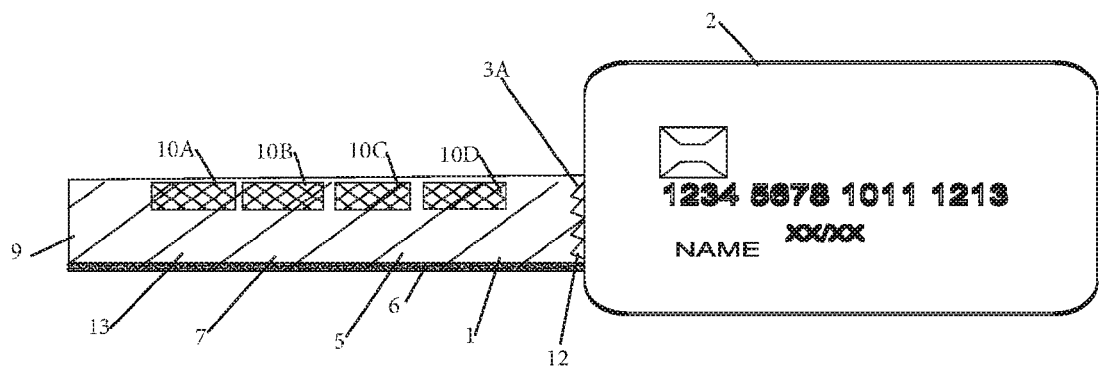
FIG. 2 is a front perspective view of the adhesive layer of the primary side of the novel barrier connected to a transactional card.

FIG. 2 illustrates barrier 1 having hinge point 3A connected to an outer perimeter edge of transactional card 2. Hinge point 3A has perforations 12. Length of material 13 has recesses 10A, 10B, 10C, and 10D located on primary side 7 of adhesive layer 5 side of length of material 13. Length of material 13 has layer of adhesive 5 overlaying layer of foam 6. Tab 9 is located on an end of length of material 13.

Figure 4:
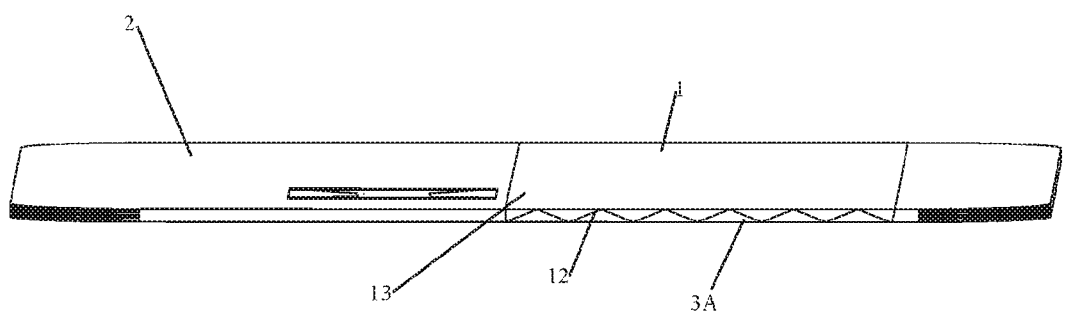
FIG. 4 is a side view of the hinge point of the novel barrier connected to a transactional card.
Figure 5:
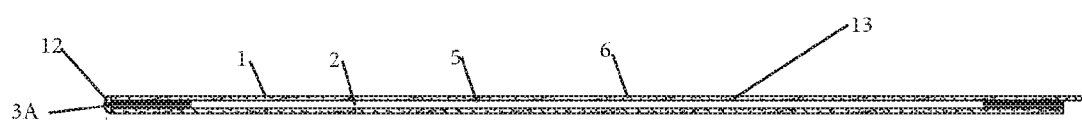
FIG. 5 is a side view of the novel barrier connected to a transactional card.

FIGS. 4 and 5 depict length of material 13 of barrier 1 having hinge point 3A having perforations 12. Hinge point 3A is connected to an edge of transactional card 2. Barrier 1 is connected to both the front and rear sides of transactional card 2. FIG. 5 shows adhesive layer 5 in contact with transactional card 2. Adhesive layer 5 overlays layer of foam 6.

Figure 6:
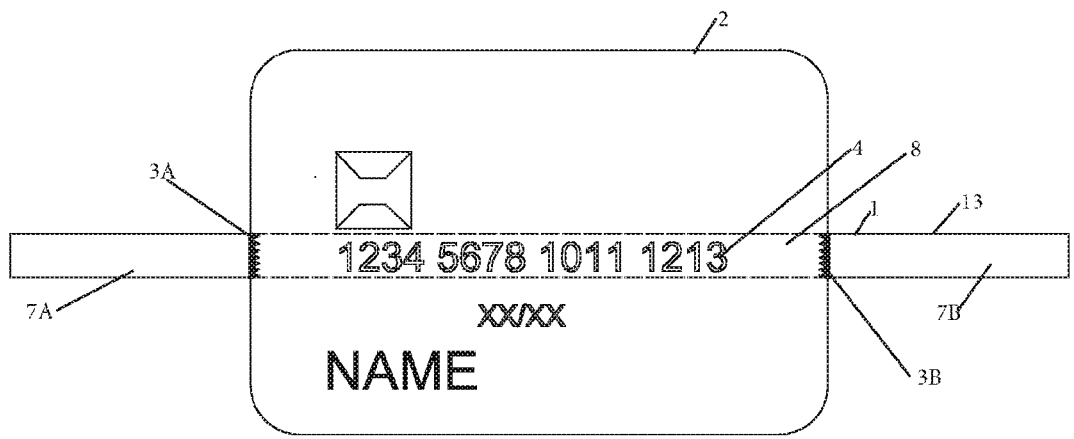
FIG. 6 is a front view of an alternate embodiment of the novel barrier having two hinge points connected to an outer perimeter edge of a transactional card.

FIG. 6 is an alternate embodiment of barrier 1 having a length of material 13 with first primary side 7A and a second primary side 7B. The first primary side 7A is connected to an end of secondary side 8 by hinge point 3A. The second primary side 7B is connected to an opposite end of secondary side 8 by hinge point 3B. First primary side 7A and secondary primary side 7B are configured to hingedly pivot to overlay a portion of text 4 located on the front face or back face of transactional card 2.

Figure 7:
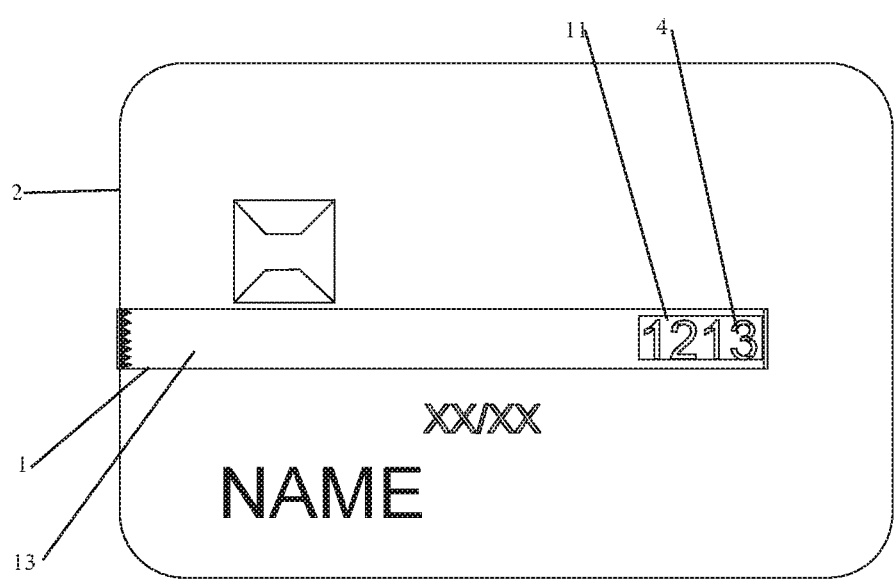
FIG. 7 is a front view of an alternate embodiment of the novel barrier connected to a transactional card having an opening for viewing text of a transactional card; and, FIG. 8 is a front view of an alternate embodiment of the novel barrier connected to a transactional card having an opening for viewing text of a transactional card.
Figure 8:
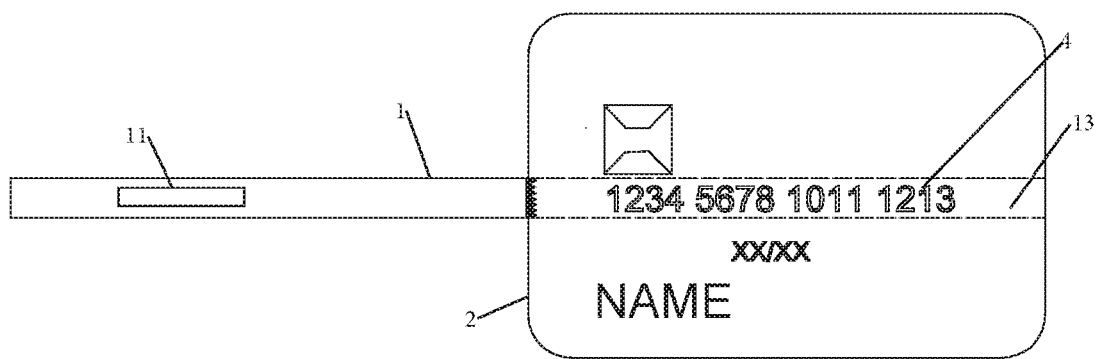

FIGS. 7 and 8 show an alternate embodiment of barrier 1 having length of material 13 connected to transactional card 2. Length of material 13 has opening 11. Opening 11 is positioned over a portion of text 4. A portion of text 4 is visible through opening 4.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A barrier configured to conceal at least a portion of text of a transactional card, comprising:
    a length of material, said length of material is configured to have a length great enough to cover said at least a portion of text of said transactional card, whereby, said length of material is configured to cover said at least a portion of text of said transactional card;
    at least a portion of said length of material having an adhesive layer, said adhesive layer is configured to secure said barrier to said transactional card; and,
    said barrier having a plurality of cross-cut slits traversing the entire length of said length of material, said plurality of cross-cut slits being oriented adjacent to each other, whereby, said plurality of slits are configured to reveal tampering of said length of material.

2. The barrier of claim 1, wherein said barrier having a plurality of perforations located thereon, whereby, said plurality of perforations are configured to reveal tampering of said length of material.

3. The barrier of claim 1, wherein said length of material is a semi-rigid plastic.

4. The barrier of claim 1, wherein said length of material is connected to a hinge point, whereby, said hinge point is configured to connect to an outer perimeter edge of said transactional card.

5. The barrier of claim 4, wherein said hinge point having at least one perforation.

6. The barrier of claim 1, wherein at least a portion of said length of material having a layer of foam.

7. The barrier of claim 1, wherein at least one end of said length of material having a tab, said tab protruding from said at least one end of said length of material.

8. The barrier of claim 1, wherein said length of material having at least one recess, said at least one recess is configured to overlay said at least a portion of text of said transactional card when said length of material is connected to said transactional card.

9. The barrier of claim 8, wherein said at least one recess has a central bore, whereby, said at least a portion of said text of said transactional card is visible through said central bore.

10. The barrier of claim 1, wherein said at length of material has a central bore, whereby, said at least a portion of said text of said transactional card is visible through said central bore.

* * * * *